United States Patent [19]

Reeh et al.

[11] Patent Number: 4,533,816
[45] Date of Patent: Aug. 6, 1985

[54] ELECTRIC WELDING GUN WITH A ROTARY TORCH HEAD

[76] Inventors: Holger Reeh, Adalbert-Stifter-Str. 1, Germering; Josef Geiss, Otto-Hahn-Str. 1, Haar, both of Fed. Rep. of Germany

[21] Appl. No.: 375,288
[22] PCT Filed: Aug. 28, 1981
[86] PCT No.: PCT/DE81/00131
§ 371 Date: Apr. 26, 1982
§ 102(e) Date: Apr. 26, 1982
[87] PCT Pub. No.: WO82/00787
PCT Pub. Date: Mar. 18, 1982

[30] Foreign Application Priority Data

Aug. 29, 1980 [DE] Fed. Rep. of Germany ....... 3032696

[51] Int. Cl.³ ............................. B23K 9/28; B23K 9/02
[52] U.S. Cl. ......................... 219/137.31; 219/137.63; 339/16 R; 339/91 R
[58] Field of Search ................. 219/137.31, 137.61, 219/60 A, 137.2, 137.42, 74, 60 R, 137.63, 219/137.9, 125.11; 339/5 M, 5 L, 16 R, 91 R

[56] References Cited

U.S. PATENT DOCUMENTS

| | | | |
|---|---|---|---|
| 3,185,148 | 5/1965 | Gaylord | 339/16 R |
| 3,196,249 | 4/1965 | Thostrup | 219/137.63 |
| 3,345,494 | 10/1967 | Apblett et al. | 219/60 A X |
| 3,493,716 | 2/1970 | Martin | 219/60 R X |
| 3,673,541 | 6/1972 | Volinskie | 339/16 R |
| 4,142,084 | 2/1979 | Torrani | 219/125.11 X |

Primary Examiner—C. L. Albritton
Assistant Examiner—Catherine M. Sigda

[57] ABSTRACT

Figure 3:
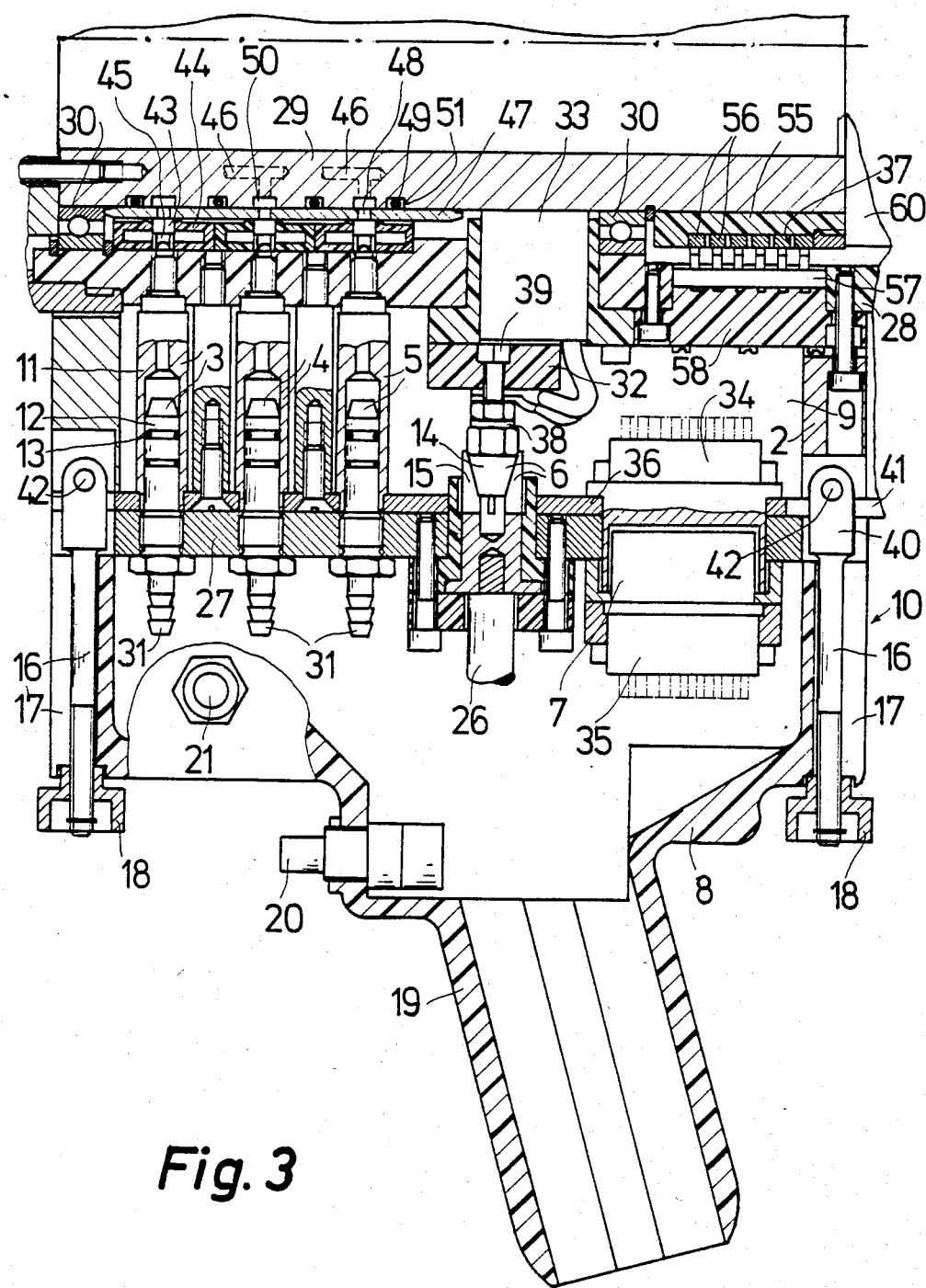

Electric welding gun with a rotary torch head which with its auxiliary devices, is housed in an outer casing (1), on which a supporting casing (2) is constructed for handling the welding gun and into which are jointly introduced the supply lines for the torch head and the auxiliary devices. In the supply lines are provided liquid and gas lines issuing into ring chambers (43) axially sealed at either side and to which are connected line ducts (46) formed in the drive shaft (29), together with electrical lines connected to a current transfer mechanism for transferring the welding current to shaft (29). The current transfer mechanism is constructed as a contact brush (33) engaging on shaft (29) and the latter is made from a slip ring material. Each of the ring chambers (43) is axially constructed between retaining rings (44) arranged in pairs on a bush (47) fixed to shaft (29) and has holes (48) connecting the particular opening of the line ducts (46) in shaft (29) to the associated ring chamber (43). Each of the supply lines in the supporting casing (2) has a line coupling (3 to 7) constructed as a plug connection. The supporting casing (2) is subdivided into a plug box (8) and a socket box (9), whose assembly leads to all line couplings (3 to 7) being coupled together (FIG. 3).

17 Claims, 9 Drawing Figures

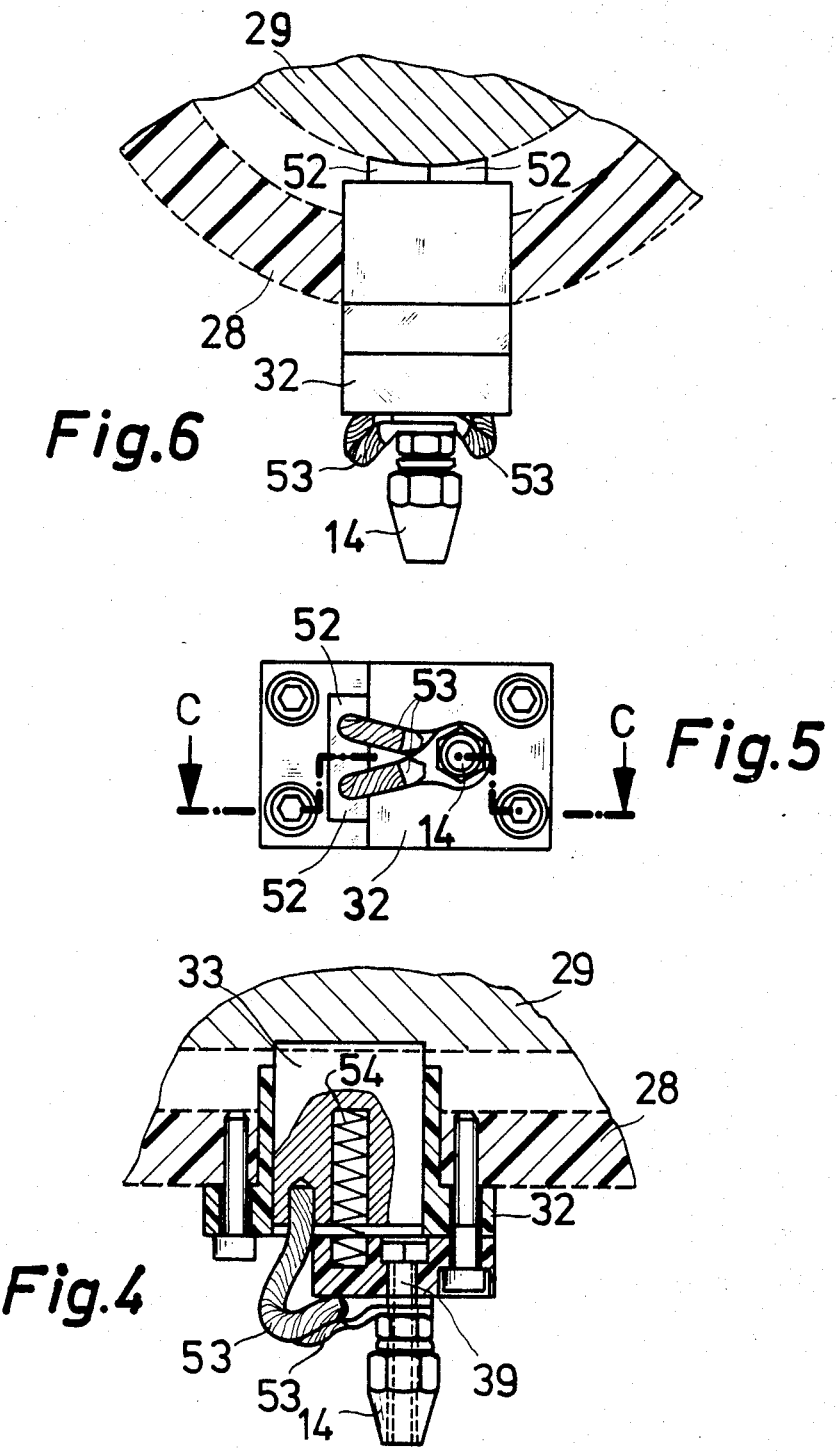

ELECTRIC WELDING GUN WITH A ROTARY TORCH HEAD

The invention relates to an electric welding gun with a rotary torch head.

In addition to a welding electrode positioned on the rotary torch head and connected to a welding lead, such welding guns generally have an inert gas nozzle connected to an inert gas line, a liquid cooling of the welding head with a liquid feed line and a liquid return line, a controllable drive motor for the welding head and frequently a filler wire reel with a separate wire feed motor positioned on a reel holder rotatable with the driving shaft of the welding head about its rotary axis and supplied and controlled by corresponding control lines. The inert gas, the cooling water, the welding current and other feed and control currents for electrically driving auxiliary devices rotatable with the torch head must therefore be transferred via corresponding distributors from the fixed casing of the welding gun to the rotor carrying the torch head and the auxiliary devices rotatable with it.

From DOS No. 2,723,034, it is known to transfer the welding current from the boss, made from electrically conductive material of the driving shaft carrying the torch head to the latter by means of driving shaft ball bearings running in a mercury bath. This is intended to provide a constant, low current passage resistance, so that, even in the case of high current intensities, the welding current level is kept constant during welding. However, on the one hand the mercury bath increases the resistance to rolling of the ball bearings and on the other hand, in order to protect both the environment and the worker, it is necessary to take expensive measures for sealing the areas containing the mercury and the mercury line into the welding gun.

In addition, in the known welding guns, the distributor ring chambers for the inert gas and cooling water are sealed by 0-rings arranged in internal slots of the hub of the driving shaft of the torch head and rests in sliding manner on said shaft. However, for a good, permanent and wear-resistant sealing of the gas and liquid distributors of a welding gun, O-rings, which are mainly intended for sealing parts which are not movable relative to one another, are disadvantageous, even if the speed of the torch head and its driving shaft is low. If, in addition, the driving shaft is made from a relatively soft light metal alloy, running grooves form in the shaft due to friction on the points of the O-rings.

The supply lines for the torch head and its auxiliary devices are combined into a welding cable and are jointly introduced into and removed from the welding gun and in the gun casing are connected to the associated supply distributors. If welding is carried out with the welding gun, e.g. at a building site, the welding cable can be damaged by site traffic. In these cases, it is advantageous if the damaged welding cable can be replaced as swiftly and rapidly as possible by another welding cable. For this purpose, it is necessary to arrange the supply line terminals and connections on the welding gun so as to give optimum easy access, thereby permitting rapid removal and replacement. It is also desirable to be able to simply and rapidly produce or detach the supply line connections with respect to the welding gun in cases such as e.g. the internal welding of a container, so that the welding gun can be passed through the man hole into the container without the welding cable, followed by connection to the latter in the container.

An object of the invention is to so construct an electric welding gun with a rotary torch head that a good current transfer to the driving shaft of the torch head, accompanied by a limited, constant transfer resistance and a good sealing of the gas and liquid distributor for transferring the cooling fluid and inert gas to the rotary torch head are ensured.

A further object of the invention is to so construct an electric welding gun with a rotary torch head that it is easily and rapidly possible to produce and remove the line connections between the gun and the welding cable containing the supply line for the same.

According to the invention, an electric welding gun is provided with a special distributor assembly for transferring the cooling fluid, inert gas and electric current to the rotary torch head and to the auxiliary welding devices. For the transfer of the fluid and gas, the associated fluid and gas lines in each case issue into an annular chamber, which, according to the invention, are constructed between seal rings, whose sealing lips engage on the outer surface of a bush with a hard, ground surface. Thus, a permanent, low-wear, good sealing of the annular chambers is obtained. Furthermore, according to the invention, the welding current transfer to the welding head driving shaft takes place by means of a contact brush and the welding shaft is made from a slip ring material. This ensures a constant, permanent, low-loss current transfer of the welding current, even in the case of a high current intensity. It is possible to choose a mating of materials for the brush and the driving shaft which furthers the sought objective of a good current transfer, without being restricted by the additional condition that the shaft material must simultaneously also be suitable for obtaining such a surface quality and hardness as is required for a good sealing of the gas and fluid distributors. In the case of a copper bronze carbon brush, the driving shaft material is preferably an aluminium alloy of the type AlMgSi 0.5F22. The bush is preferably made from steel.

As a result of the invention, it is also unnecessary to form costly and complicated internal slots in the driving shaft boss for forming the annular chambers, because in the present case the chambers are formed between the particular pairs of seal rings and the rings forming each pair can be maintained with the appropriate spacing by means of drilled spacing rings.

In addition, the invention provides an electric welding gun with a rotary torch head and with a special supply assembly for connecting the torch head supply lines to the distributor for transferring the cooling fluid, inert gas and electric current to the rotary torch head. According to the invention, the supporting casing of the welding gun into which all the supply lines are introduced together, is subdivided into a plug box and a socket box for forming a multi-point connector and to each of the said boxes is fixed one of the two coupling parts of the line couplings constructed in each case as a connector. Therefore, all the line couplings can be formed by mounting the plug box into which the welding cable is introduced, on the socket box on the welding gun casing, whilst they can be jointly removed by removing the plug box from the socket box. The plug box clearly offers a good possibility for securing the end of the welding cable for forming a reliable and durable tension relief on the plug box.

The aforementioned construction according to the invention also makes it possible to couple the welding gun with different plug boxes, as required. Thus, in particular, one plug box can be constructed as a gun handle to whose hollow portion can be introduced the welding cable enabling the gun to be operated as a hand gun by its handle, on which are provided appropriate operating switches in such a way that they can be easily operated. The other plug box can be fitted to a manipulator, so that for operation by the manipulator, the welding gun only has to be mounted by the socket box of its support casing on the plug box of the manipulator to fix it to the latter and simultaneously obtain the line couplings.

Figure 1:
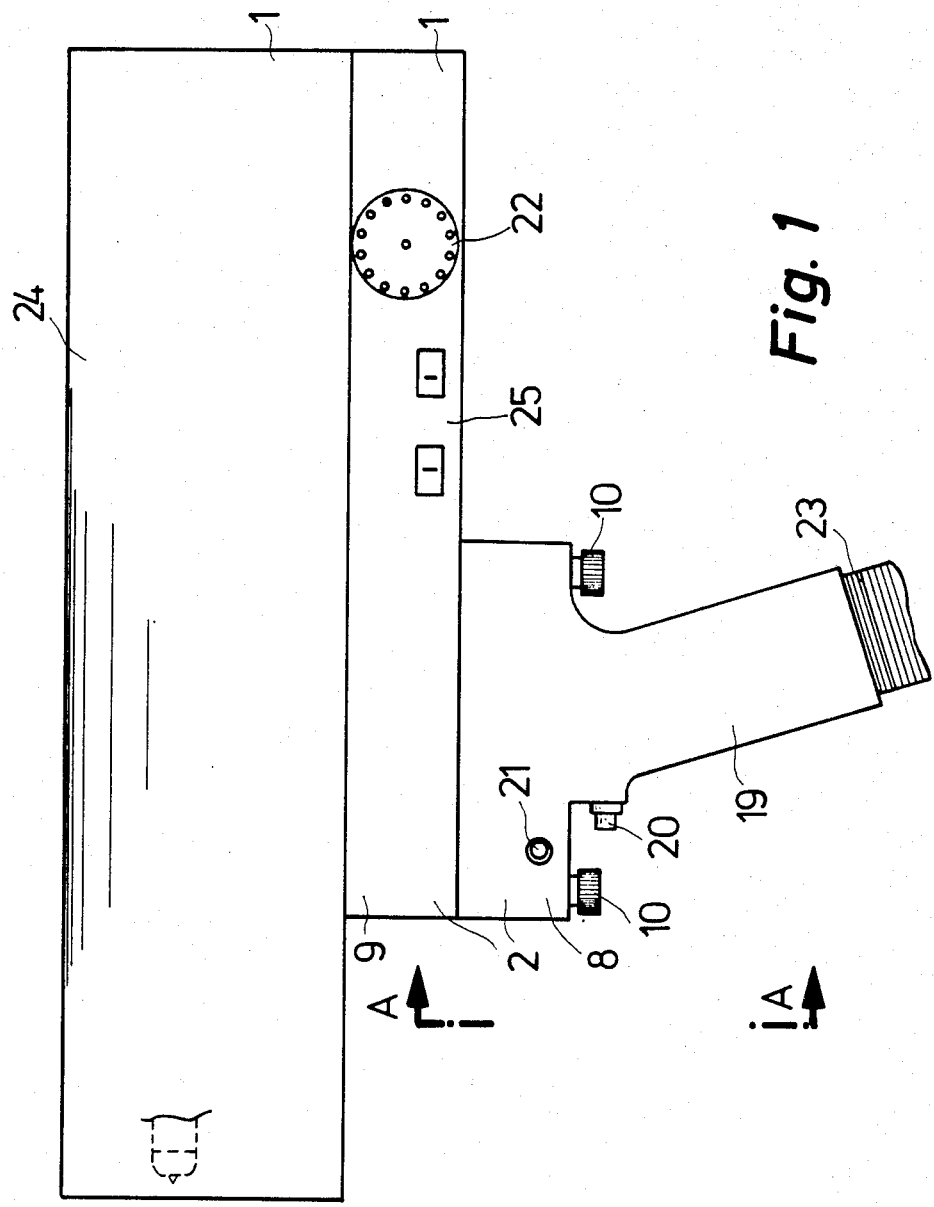

The invention is described in greater detail hereinafter relative to non-limitative embodiments and the drawings, wherein show:

FIG. 1 a side view of a welding gun in diagrammatic form.

Figure 2:
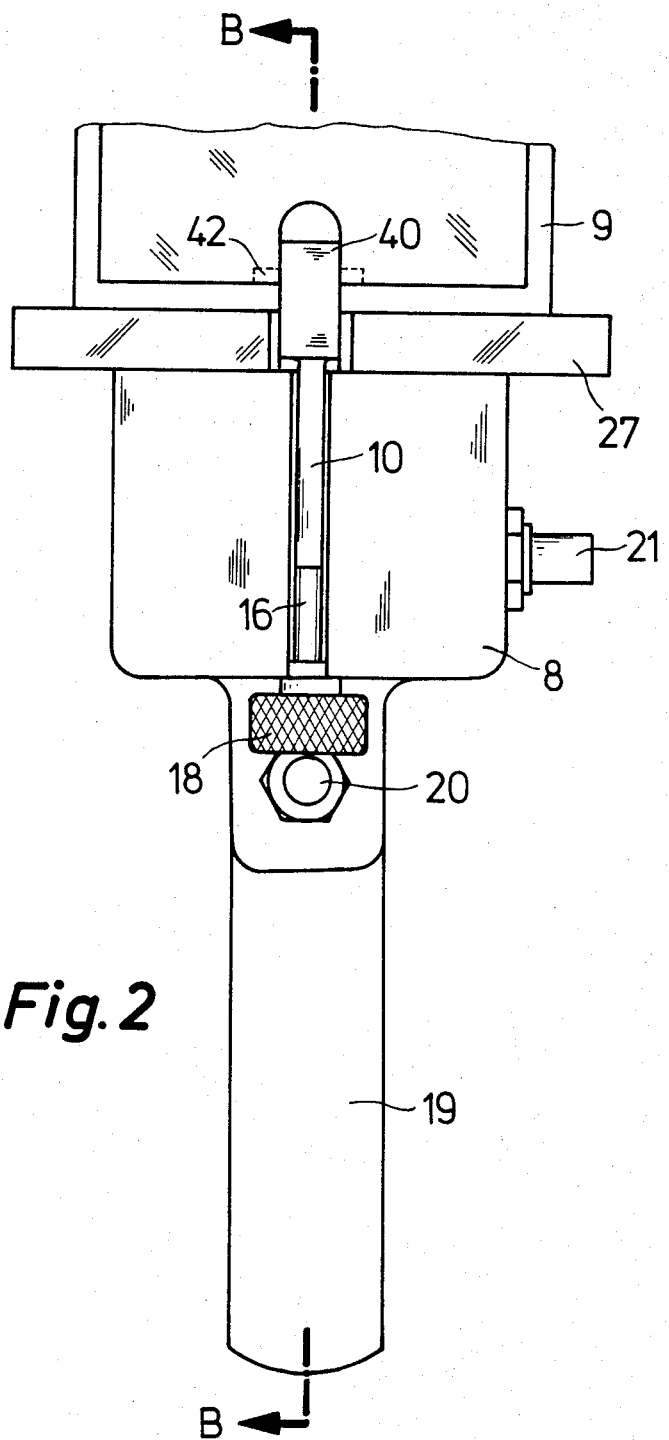

FIG. 2 the front view of the supporting casing of the welding gun of FIG. 1 along line A-A therein.

FIG. 3 the longitudinal section through the supporting casing of FIG. 2 along intersection line B-B therein.

FIGS. 4 to 6 details of a contact brush for welding current transfer to the rotary welding head.

Figure 9:
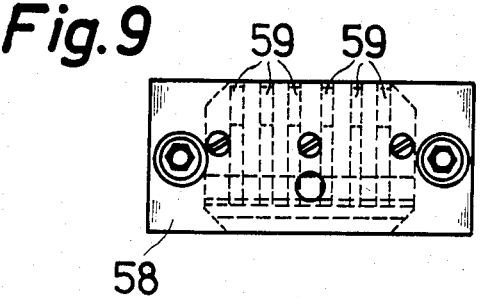
Figure 8:
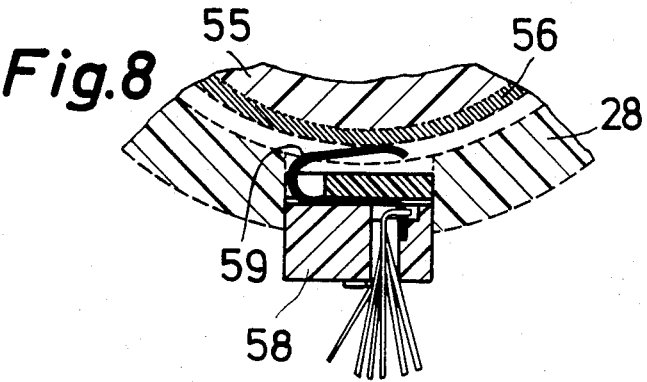
Figure 7:
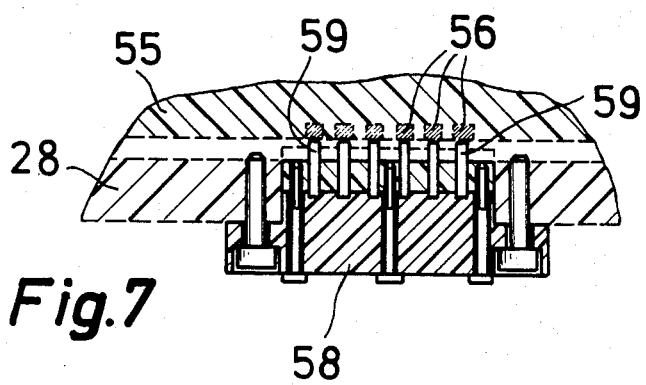

FIGS. 7 to 9 details of a control line distributor for the control current transfer to separately driven and controlled auxiliary devices rotatable with the rotary welding head.

Only an external view of the welding gun is provided in FIG. 1. The gun has an outer casing 1 in the form of a tubular protective casing 24 and a base casing 25 extending from the bottom of the former. The rotary torch head (not shown) is placed in protective casing 24 on the left-hand side in FIG. 1 and is driven by a shaft extending over the length of said casing and is constructed in the rear part of the gun as a not shown reel holder rotating with the torch head and on which is arranged a filler wire reel together with its wire feed means. The elongated base casing 25 contains at the rear end of the welding gun the drive motor for the torch head and together with the front part forms a supporting casing 2 which in the lower part is constructed as a gun handle with a hollow handle portion 19 through which is introduced into the gun welding cable 23 containing the supply lines for the welding head and its auxiliary devices. A control switch 20 for controlling the welding cycle is arranged at the front on the gun handle. An emergency switch 21 is positioned laterally on the gun handle and can be used for stopping the gun in emergencies.

For forming a multiple line coupling for all the supply lines contained in welding cable 23, supporting casing 2 is subdivided into a socket box 9 at the front end of base casing 25 and a plug box 8 on which is formed the handle portion 19 of the gun handle. By means of in each case one locking device 10 at the front and rear ends of plug box 8 the latter can be fixed to socket box 9. The end of welding cable 23 is fixed in tension-relieved manner in hollow handle portion 19.

Supporting casing 2 (FIG. 3) contains a line coupling 3 to 7 constructed as a connector for each of the supply lines contained in the welding cable. All the line couplings 3 to 7 are gently arranged in the vertical median longitudinal plane of supporting casing 2 and are aligned parallel to one another. One coupling part of each of the line couplings 3 to 7 is fixed to one cover plate 27 of plug box 8, whilst the associated other coupling part of line couplings 3 to 7 is fixed in corresponding arrangement and alignment in socket box 9, so that by fitting plug box 8 to socket box 9 all the line couplings 3 to 7 can be jointly and simultaneously coupled in.

The front part of supporting casing 2, to the right in FIG. 3, contains a group of three identically constructed line couplings 3 to 5 for the inert gas line, the cooling water feed line and the cooling water return line. Each of these line couplings 3 to 5 has a cylindrical pipe nipple 12 screwed to cover plate 27 of plug box 8 and projecting above the top of said plate 27. The nipple is peripherally provided with two slots for receiving sealing rings 13 and a coupling sleeve 11 screwed in socket box 9 in a through hole in an insulating tube 28 in which is mounted the torch head shaft 29 by means of two ball bearings 30. The pipe nipples 12 terminate in hose nipples 31 projecting beyond the bottom of cover plate 27 of plug box 8 and onto which is placed the particular line end of the gas or fluid lines and can optionally be secured by means of a clip or clamp.

The line coupling 6 for the welding current line 26 is connected to the group of three line couplings 3 to 5 for the gas or fluid lines. One coupling part of line coupling 6 is a longitudinally slotted conical bush 15 fixed in an insulating casing in cover plate 27 and projecting over the top of the latter. Bush 15 is located in an insulating holder 32 of a contact brush 33 screwed to insulating tube 28 within socket box 9 and from the said brush the welding current is transferred to the rotating shaft 29 of the welding head. As a result of the longitudinal slots in the hollow conical bush 15 the latter can resiliently expand somewhat under the contact pressure by which it is pressed onto the conical mandrel 14 leading to a maximum contact surface between conical bush 15 and conical mandrel 14 of the welding current line coupling 6. These contact surfaces are gold plated to give an optimum favourable current transfer.

To the back of the welding current line coupling 6 is connected the line coupling 7 for the control line, which as a multi-point connector comprises a socket 34 fixed to the base plate of socket box 9 and a plug 35 fixed to cover plate 27 of plug box 8. The outputs of socket 34 are connected via not shown line portions on the one hand to a control distributor group 37 for the transfer of the drive and control currents to the not shown filler wire feed drive rotating with shaft 29 and on the other hand via corresponding connecting lines to the drive and control inputs of the torch head drive motor located at the rear end of the welding gun. In addition, not shown branch lines are connected to the outputs of socket 34 and lead to a reference socket 22 (FIG. 1) positioned in the rear part of the welding gun on the side of the base casing 25 of the outer casing 1 thereof, so that at this point there is additional access to the welding head control lines by means of a not shown control cable plug which can be plugged into the reference socket 22.

With the exception of the welding current line coupling 6, all the line couplings 3 and 5 and 7 are constructed in such a way that in the plugging direction the coupling parts engage in one another with a clearance, so that they do not represent limiting stops for the welding current line coupling 6, whose coupling parts 15, 16 can consequently be pressed against one another in the plug direction with the necessary contact pressure, without it being a question of maintaining close positioning tolerances for the parts of the other line couplings 3 to 5 and 7. At least one of the two couplings parts 14, 15 of the welding current line coupling 6 can by adjustment undergo a position change in the plugging direction e.g. by using a washer 38 of correspondingly chosen thickness for mandrel 14 which is screwed onto a screw bolt 39 anchored in brush holder 32. It is also possible to in particular resiliently support the conical mandrel 14 in the plugging direction if the inherent resilience resulting from the construction of the longitudinal slots in conical bush 15 is not sufficient for this purpose.

In addition, the contact pressure for the welding current line coupling until cover plate 27 of plug box 8 strikes against base plate 36 of socket box 9 is determined by the locking device 10 for locking plug box 8 to socket box 9. At the front and rear faces of supporting casing 2, locking device 10 has in each case a swing bolt 16, pivotable on socket box 9 in an associated outer slot 17 which on the associated outside of the plug box runs in the swivel plane of swing bolt 16 parallel to the plugging direction of line couplings 3 to 7. The swing bolt can be braced by means of a manually operable nut 18 engaging on the front edge of the end of outer slot 17 on the plug box for the purpose of pressing the latter against the socket box. In the socket box 9 the swing bolts 16 have in each case a square head 40 which through a guidance slot 41, permitting the pivoting of square head 40, but preventing it from rotating about the screw axis, projects beyond the base plate 36 of socket box 9 and there has a cross pin 42 pivotably resting on base plate 36 on either side of guidance slot 41.

The coupling sleeve 11 of line couplings 3 to 5 for the inert gas and/or cooling water in each case issue with their end screwed into insulating tube 28 into a distributor ring chamber 43, which is in open connection with an associated line duct 46 leading to the torch head and constructed in the wall of hollow shaft 29. Ring chambers 43 are in each case constructed between two seal rings 44 facing one another by their radially projecting inner sealing lips and with their outer periphery engaging on the inner periphery of insulating tube 28 on which is supported shaft 29 by means of ball bearings 30. Between the seal rings 44 associated with the same ring chambers 43, a cross-sectionally U-shaped spacing ring 45 is introduced in each case into insulating tube 28, so that it defines an external peripheral slot into which issues the mouth of the associated coupling sleeve 11 and which is preferably multiply drilled on its U-web, so that the necessary flow connection with the corresponding ring chamber 43 is formed. Adjacent seal rings 44 of adjacent ring chambers 43 are supported with respect to one another by their axial backs. Seal rings 44 engage by their radially inner sealing lips in sliding manner on a seal bush 47, which is mounted on shaft 29 and is fixed to shaft 29 on O-rings 49 secured between bush 47 and shaft 29, so that they rotate with the latter. Between the seal rings 44 between each ring chamber 43, steel bush 47 has a row of radial connecting holes 48 distributed over the bush circumference, whilst under each circumferential row of connecting holes 48 a distributor ring slot 50 is formed in the outer circumference of shaft 29 and into whose bottom issues the associated line duct 46. Due to the fact that the ring chambers 43 are connected with the associated distributor ring slot 50 via a plurality of connecting holes 48, there is a corresponding low flow resistance for the flow medium to be introduced into the associated line duct 46 in shaft 29 or for the cooling water return line for the water flowing out of the associated line duct 46. In either side of each distributor wall slot 50, one of the O-rings 49 is positioned in a ring nut 51 formed in shaft 29, so that slots 50 are sealed on either side.

The welding electrode current is supplied to the torch head by shaft 29. The welding current is transferred to shaft 29 from brush 33 of welding current line coupling 36. Thus, shaft 29 is made from a slip ring material, preferably an aluminium alloy which is adapted to the material of brush 33, so as to ensure an optimum good, large-area current transfer after the reciprocal grinding of the contact surface of brush 33 and the associated bearing surface of shaft 29. In the case of such material for shaft 29 it is rather complicated to ensure an adequate surface quality in order to directly seal on the circumferential surface of the rotating shaft by means of seal rings the gas and fluid distributors cooperating with the line ducts 46 in shaft 29 and thereby obtain an adequately good seal. Thus, in the represented embodiment, the steel bush 51 is mounted on shaft 29. The ground outer surface of the steel bush 51 rotating with the shaft with respect to seal ring 44 ensures a good, weararm sealing of the gas and fluid distributors in conjunction with the sealing lips of the seal rings during the rotary movement of shaft 29, whilst on the inside of steel bush 51 O-rings can be provided for sealing purposes, because here there is no relative movement between the parts to be sealed.

The construction and arrangement of contact brush 33 and its insulating holder 32 on which is supported the conical mandrel 14 of welding current line coupling 6 is apparent from FIGS. 4 to 6. FIG. 4 shows the longitudinal section containing the axis of shaft 29 corresponding to intersection line C-C in FIG. 5 in which the plan view is shown, whilst FIG. 6 shows the front view viewed parallel to the axis of shaft 29. Contact brush 33 is subdivided into two brush halves 52 arranged in succession in the circumferential direction of shaft 29. These contact halves 52 are separately slidingly guided in insulating holder 32 of brush 33 engaged in an opening of insulating tube 28 and screwed to the latter and are pressed against the circumferential surface of shaft 29 by a spring 54 supported on insulating holder 32. One end of a line portion 53 in the form of a coil is soldered into each brush half 52. At their other end, the line portions 53 have in each case a circular disk mounted on the screw bolt 39 holding the conical mandrel 14 of the welding current line coupling and secured to insulating holder 32 by means of a nut screwed to bolt 39 between mandrel 14 and holder 32.

As can be gathered from FIG. 3, brush 33 is located between the gas and fluid distributor group and control distributor groups 37 and has a plurality of slip rings 56 on an insulating bush 55 placed thereon in non-rotary manner with shaft 29. An insulating material holder 58 is engaged in a circumferential opening 57 of insulating tube 28 and is screwed to said tube 28. Holder 58 carries a number of sliding contact springs 59 corresponding to the number of slip rings 56 and said springs are connected to corresponding output of socket 34 of coupling 7 for the control lines. In turn, slip rings 56 are connected by not shown line connections to the feed and control terminals of a filler wire feed motor (not shown) positioned on a filler wire reel holder (not shown) flanged by means of flange 60 to the rear end of shaft 29 and by means of which the latter is driven. The details of the control distributor group 37 can be gathered from FIGS. 7 to 9.

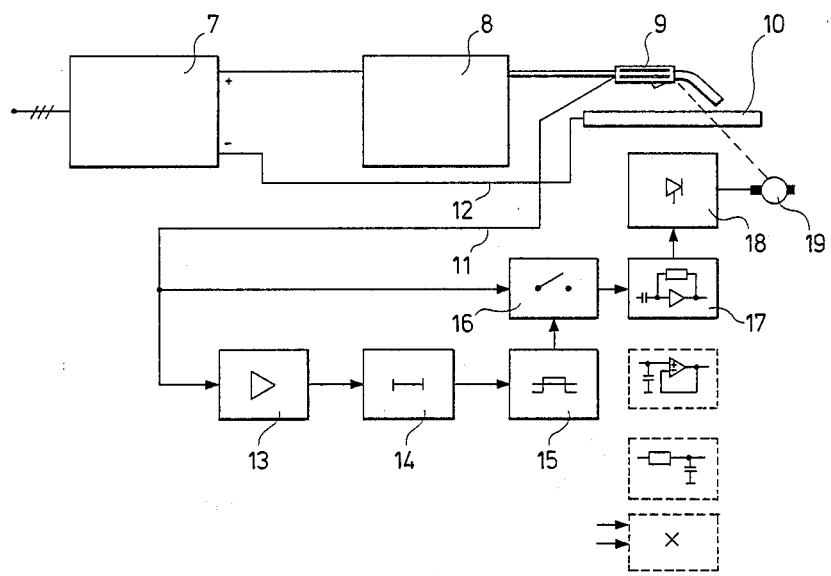

We claim:

1. An electric welding gun comprising: a rotary driving shaft in an outer casing provided with a supporting casing for handling the welding gun; a plurality of supply lines jointly introduced into the supporting casing, said plurality of supply lines comprising liquid and gas lines including a cooling water feed line, a cooling water return line and an inert gas feed line; means for conducting the output of each supply line into a respective axially sealed ring chamber in the outer casing for supplying line ducts formed in the rotary driving shaft, said plurality of supply lines further comprising a welding current line connected to a current transfer means for transferring welding current to the shaft made of electrically conductive material and electrical control lines, each of said supply lines having a line coupling within said supporting casing wherein each of said line couplings is a plug connection and said supporting casing is subdivided into a plug box and a socket box adapted to be assembled to form the supporting casing and to be locked together in the assembled arrangement by a locking mechanism, said plug connections extending parallel to each other and each of said plug connections comprising two coupling parts, one fixed to said plug box and the other fixed to said socket box, whereby the said plug box and socket box cooperate to form a multi-point connector in such a way that said two coupling parts of each of said plug connections are commonly assembled by said assembling of the plug box and the socket box.

2. An electric welding gun according to claim 1, wherein said current transfer means is a contact brush engaging on the driving shaft, said electrically conductive material of the driving shaft being a slip ring material, and wherein the ring chambers are in each case axially defined between seal rings arranged in pairs on a bush and provided with sealing lips which in each case face the associated ring chamber, said bush being fixed to the driving shaft and having holes connecting the line ducts in the driving shaft with the associated ring chamber.

3. An electric welding gun according to claim 1, further including O-rings arranged in ring slots of the driving shaft between the driving shaft and said bush, in each case on either side of the associated ring chambers.

4. An electric welding gun according to claim 1 wherein said bush has a row of connecting holes for each ring chamber distributed around the bush circumference and said driving shaft under each of said rows of connecting holes has a distributor ring groove into which issues a particular of said line ducts.

5. An electric welding gun according to claim 1 wherein the contact brush is positioned between said bush and a control distributor group having an insulating bush fixed to the driving shaft and provided with a plurality of slip rings cooperating with sliding contact springs fixed to the casing, said electrical control lines being connected to said sliding contact springs.

6. An electric welding gun according to claim 1, wherein said line couplings of said liquid and gas lines are constructed as sealing couplings in which one coupling part is constructed as a cylindrical sleeve and the other coupling part as a cylindrical pipe nipple which can be inserted into the sleeve and comprises at least one sealing ring, wherein further the line coupling for the welding current line is a conical coupling in which the one coupling part is a conical mandrel and the other coupling part is a longitudinally slotted conical bush, and wherein the line coupling of the control lines is a multi-pin connector.

7. An electric welding gun according to claim 1, wherein said locking mechanism of said plug box and socket box comprises pivotably supported swing bolts adapted to be swung into an outer slot of said plug box, said outer slot extending parallel to said plug connections, said swing bolts being further adapted to be braced to the plug box by means of manually operatable nuts.

8. An electric welding gun according to claim 1, wherein the plug box is constructed as a gun handle through whose hollow handle portion are passed the supply lines combined into a cable and which comprises a control switch and an emergency switch.

9. An electric welding gun according to claim 6 wherein said line coupling of the control lines forms a branching connection leading to a reference socket on the outer casing, the reference socket being spaced from the supporting casing.

10. Electric welding gun apparatus comprising:
a plurality of supply lines for said gun;
a rotary torch head drive shaft;
a supporting casing for said rotary drive shaft subdivided into a plug box and a socket box adapted to be assembled to form the supporting casing and to be locked together in assembled arrangement by a locking mechanism;
a plurality of plug connections for said supply lines, each comprising two coupling parts, one being fixed to said plug box and the other being fixed to said socket box, whereby the said plug box and socket box cooperate to form a multi-point connector in such a way that said two coupling parts of each said plug connection are commonly assembled by the assembling of the plug box and the socket box.

11. The apparatus of claim 10 wherein said drive shaft is formed of slip ring material and further including:
a plurality of line ducts in said drive shaft;
means for communicating electric current to said drive shaft;
bush means attached to said drive shaft, said bush means having a plurality of holes therein, each said hole connecting to one of said line ducts;
a plurality of ring chambers, each said chamber being positioned to communicate with a corresponding said hole; and
a plurality of sealing rings arranged on said bush, each said sealing ring having a sealing lip which faces an associated ring chamber.

12. In an electric welding gun, the improvement comprising:
a drive shaft having a plurality of line ducts therein;
bush means attached to said drive shaft, said bush means having a plurality of holes therein, each said hole connecting to one of said line ducts;
a plurality of ring chambers, each said chamber being positioned to communicate with a corresponding said hole; and
a plurality of sealing rings arranged adjacent said bush means, each said sealing ring having a sealing lip which faces a said ring chamber.

13. The improvement of claim 12 wherein said drive shaft is constructed of slip ring material and further including a contact brush means for communicating electric current to said drive shaft.

14. The improvement of claim 12 further including spacing ring means forming a fluid conducting path into each said ring chamber.

15. The improvement of claim 14 wherein each of said sealing rings further includes a sealing portion which abuts a respective spacing ring means.

16. The improvement of claim 14 wherein each said sealing ring is of U-shaped cross-section having a first sealing lip abutting said bush and a said ring chamber and second sealing lip abutting a said spacing ring means.

17. The improvement of claim 16 further including O-ring seal means located between said bush means and said drive shaft.

* * * * *

United States Patent [19]

Mäkimaa

[11] Patent Number: 4,533,817
[45] Date of Patent: Aug. 6, 1985

[54] METHOD FOR MEASURING THE FREE WIRE LENGTH IN MIG/MAG WELDING

[75] Inventor: Tapani Mäkimaa, Lahti, Finland

[73] Assignee: Kemppi Oy, Lahti, Finland

[21] Appl. No.: 556,909

[22] Filed: Dec. 1, 1983

[30] Foreign Application Priority Data

Dec. 29, 1982 [FI] Finland .............................. 824500

[51] Int. Cl.³ .............................................. B23K 9/12
[52] U.S. Cl. ........................... 219/137.71; 219/137 PS
[58] Field of Search ...................... 219/137.71, 137 PS

[56] References Cited

U.S. PATENT DOCUMENTS 3,627,975 12/1971 Goto ............................... 219/137.71
3,731,049 5/1973 Kiyohara et al. ................ 219/137.71
4,000,374 12/1976 De Keyser ....................... 219/137.71

Primary Examiner—Clifford C. Shaw
Attorney, Agent, or Firm—Bucknam & Archer

[57] ABSTRACT

The present invention relates to a method for measuring the free wire length in hot-arc or short-arc MIG/MAG welding by making use of the typical behavior of the current or the voltage in the bead short-circuit situation, in which the voltage rises in different ways depending on the free wire length. The phenomenon can be used for measuring the free wire length.

7 Claims, 4 Drawing Figures